(12) United States Patent
Stewart et al.

(10) Patent No.: US 7,690,865 B1
(45) Date of Patent: Apr. 6, 2010

(54) FLOOD PREVENTION DEVICE

(76) Inventors: Tommy D. Stewart, 170 Grandview Dr., Green River, WY (US) 82935; Kendrah A. Olson, 170 Grandview Dr., Green River, WY (US) 82935

( * ) Notice: Subject to any disclaimer, the term of this patent is extended or adjusted under 35 U.S.C. 154(b) by 0 days.

(21) Appl. No.: 12/458,696

(22) Filed: Jul. 21, 2009

(51) Int. Cl.
*E02B 7/08* (2006.01)

(52) U.S. Cl. ................. 405/115; 405/114; 52/169.14

(58) Field of Classification Search ............... 405/107, 405/114, 115, 87, 90, 91, 103, 104; 52/169.14
See application file for complete search history.

(56) References Cited

U.S. PATENT DOCUMENTS

| | | | |
|---|---|---|---|
| 4,252,461 A * | 2/1981 | Colamussi et al. .......... 405/115 |
| 4,458,456 A * | 7/1984 | Battle .......................... 405/115 |
| 4,488,386 A * | 12/1984 | Thompson ............... 52/169.14 |
| 4,502,816 A | 3/1985 | Creter, Jr. et al. |
| 4,692,060 A | 9/1987 | Jackson, III |
| 4,875,549 A | 10/1989 | Denny et al. |
| 4,921,373 A | 5/1990 | Coffey |
| 4,981,392 A | 1/1991 | Taylor |
| 5,040,919 A | 8/1991 | Hendrix |
| 5,934,027 A | 8/1999 | Khalili |
| 5,988,946 A * | 11/1999 | Reed .......................... 405/115 |
| 5,993,113 A | 11/1999 | Darling |
| 6,029,405 A * | 2/2000 | Wood ....................... 52/169.14 |
| 6,132,140 A | 10/2000 | Kullberg |
| 6,164,870 A | 12/2000 | Baruh |
| 6,216,399 B1 * | 4/2001 | Belarbi ....................... 405/115 |
| 6,296,420 B1 * | 10/2001 | Garbiso ...................... 405/115 |
| 6,334,736 B1 | 1/2002 | Johnson et al. |
| 6,425,213 B1 * | 7/2002 | Lachapelle ............... 52/169.14 |
| 6,450,733 B1 * | 9/2002 | Krill et al. .................. 405/114 |
| 6,679,654 B1 | 1/2004 | Wittenberg et al. |
| 7,364,385 B1 | 4/2008 | Luke |
| 2007/0243021 A1 | 10/2007 | Tyler |
| 2008/0008533 A1 * | 1/2008 | Rehn .......................... 405/114 |

FOREIGN PATENT DOCUMENTS

| | | |
|---|---|---|
| JP | 8239817 | 9/1996 |
| JP | 2003020626 | 1/2003 |

* cited by examiner

*Primary Examiner*—Frederick L Lagman
(74) *Attorney, Agent, or Firm*—Richard C. Litman

(57) ABSTRACT

The flood prevention device includes a plurality of barrier walls interconnected around a structure or area to be protected. Each barrier wall includes a base sand tube adapted to be filled with sand. At least one gill tube may be stacked atop the sand tube and stitched together to form a wall of desired height. Each gill tube includes a plurality of reinforced gills adapted to permit water flow to fill the gill tube. A hanging tube is operatively disposed above each wall. A pulley mooring system may be disposed on the sides of the structure with one end operatively attached to interlocking poles disposed in the hanging tubes. Opposing sides of each barrier wall include interlocks that may be selectively attached to a locking corner track or a locking extender track to form the overall barrier. Once assembled, the flood prevention device may be lifted or rapidly deployed by the pulley mooring system.

12 Claims, 4 Drawing Sheets

FLOOD PREVENTION DEVICE

BACKGROUND OF THE INVENTION

1. Field of the Invention

The present invention relates to disaster prevention devices, and more specifically to a flood prevention device that can be easily installed and rapidly deployed around a dwelling structure in advance of a potential flood.

2. Description of the Related Art

Floods are a natural phenomenon that can have severe, devastating effects. Recent floods in Louisiana and elsewhere around the world caused the deaths of thousands and billions of dollars in damages that have yet to be fully recovered from. Some of these floods were survivable or the damages could have been minimized with fair warning and preparations, but not everyone in a flood prone area have the means to safeguard their property.

A common way to survive a flood is to build a water and debris impermeable barrier around an area or structure to be protected. These barriers range from building a sandbag wall to a sectional, water inflatable wall to name a few. The former is a well-known method that requires much manpower and finances that most may not be able to accommodate. The latter requires pre-filling of the wall with water to be effective, but the wall itself may not be readily stacked to adapt to optimal height or uneven terrain. Thus, it would be beneficial in the art to provide a flood barrier that can be easily installed and rapidly deployed in the event of a flood.

Thus, a flood prevention device solving the aforementioned problems is desired.

SUMMARY OF THE INVENTION

The flood prevention device includes a plurality of barrier walls interconnected around a structure or area to be protected. Each barrier wall includes a base sand tube adapted to be filled with sand. At least one gill tube may be stacked atop the sand tube and stitched together to form a wall of desired height. Each gill tube includes a plurality of reinforced gills adapted to permit water flow to fill the gill tube. A hanging tube is operatively disposed above each wall. A pulley mooring system may be disposed on the sides of the structure with one end operatively attached to interlocking poles disposed in the hanging tubes. Opposing sides of each barrier wall include interlocks that may be selectively attached to a locking corner track or a locking extender track to form the overall barrier. Once assembled, the flood prevention device may be lifted or rapidly deployed by the pulley mooring system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
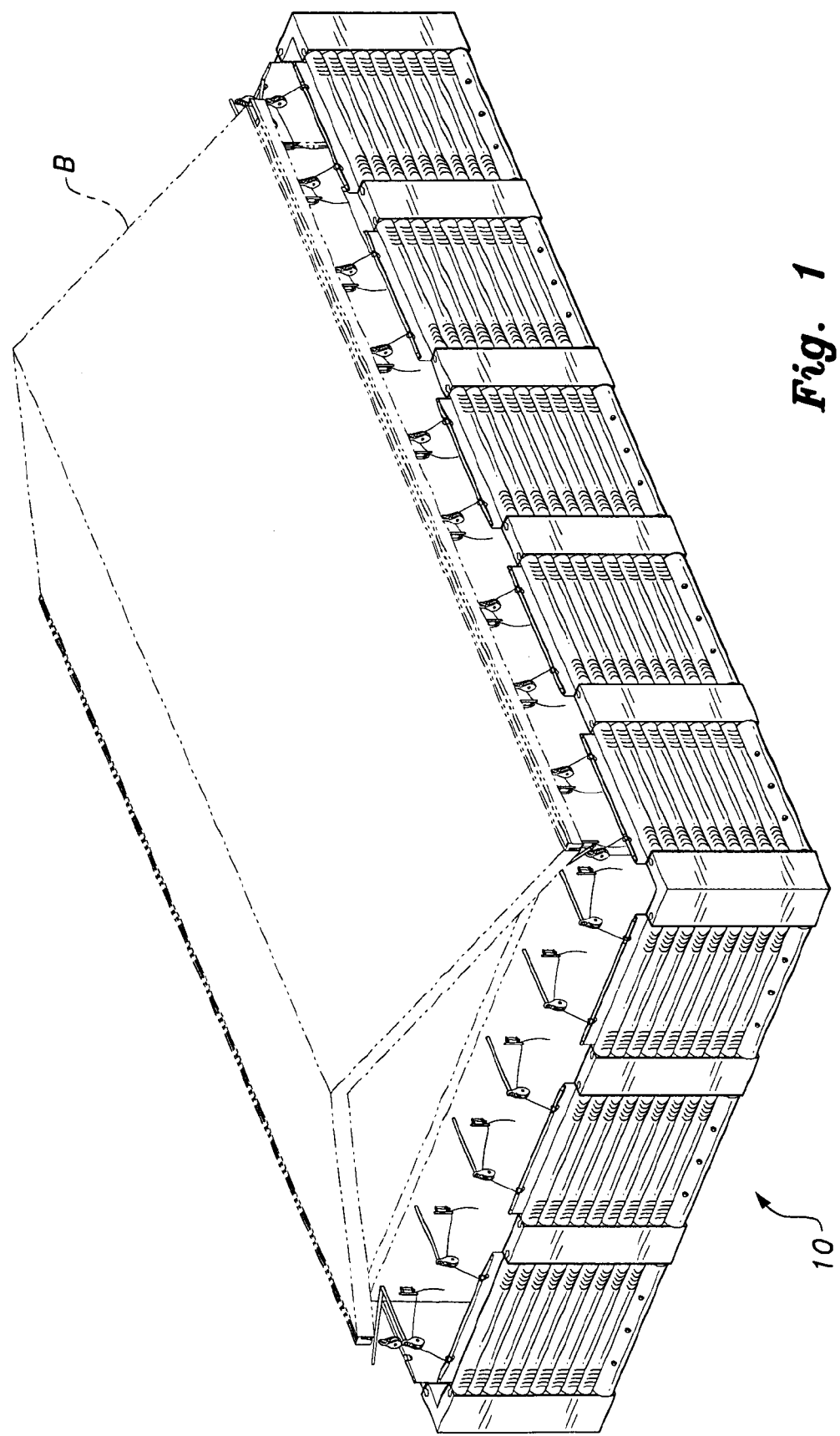
FIG. 1 is an environmental, perspective view of a flood prevention device according to the present invention.
Figure 2:
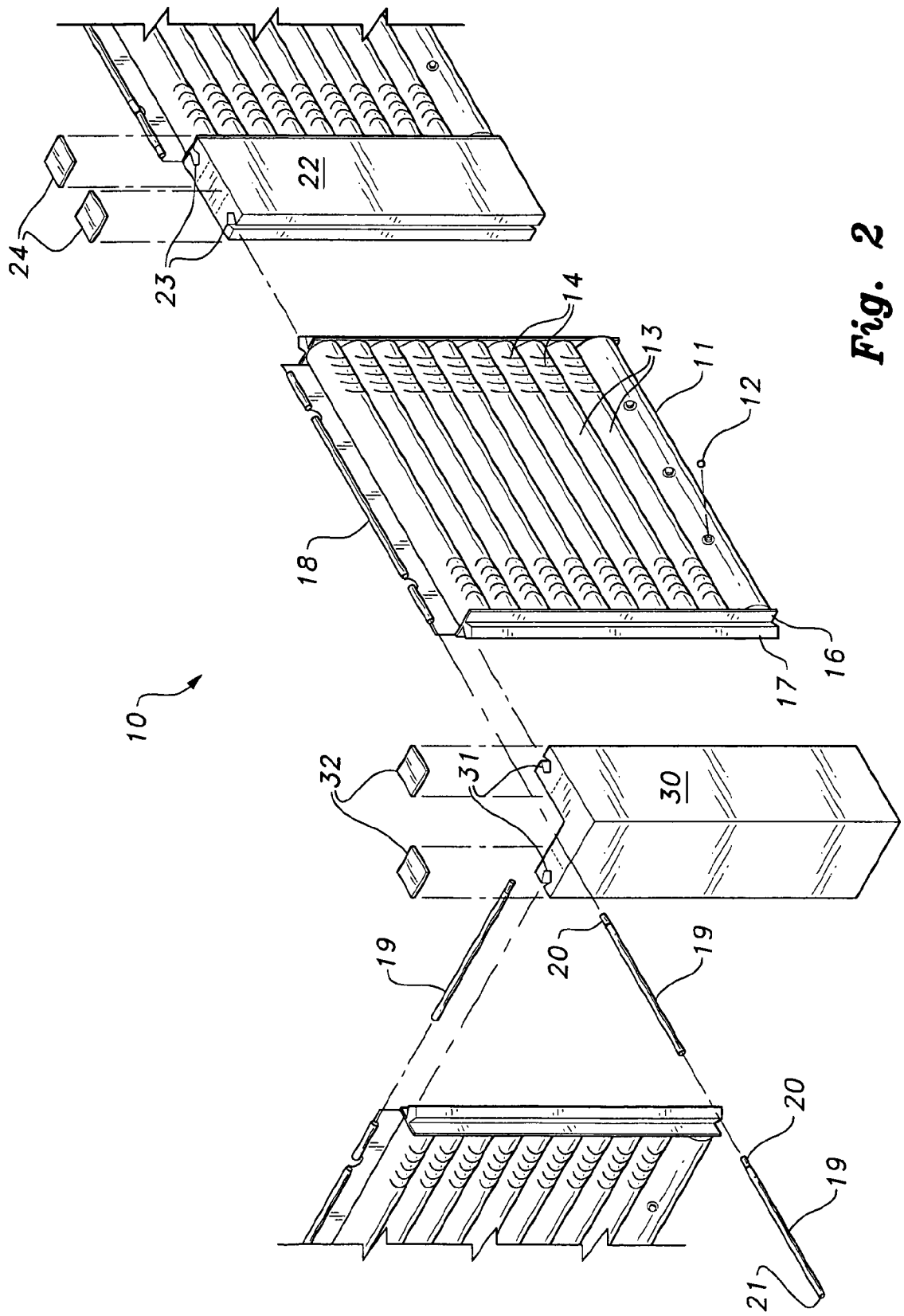
FIG. 2 is an exploded partial perspective view of the flood prevention device of FIG. 1.

The present invention relates to a flood prevention device, generally referred to by reference number 10, that is highly configurable for various building structures or areas for easy installation and rapid deployment. As shown in FIGS. 1 and 2, the flood prevention device 10 includes at least one sectional barrier wall interconnected to form a barrier around a building B to be protected. Each sectional barrier wall can be made in a wide range of sizes, and each sectional barrier wall can be used singly or in combination according to the predefined desires of the user.

Each sectional barrier wall includes a base sand tube 11 adapted to be filled with sand, which provides a substantial foundation for the barrier wall. Once filled, the sand tube 11 may be stopped by a fill cap or plug 12. The sand tube 11 may be made from plastic, steel or composites as long as it is water impermeable, sturdy and lightweight.

Figure 3:
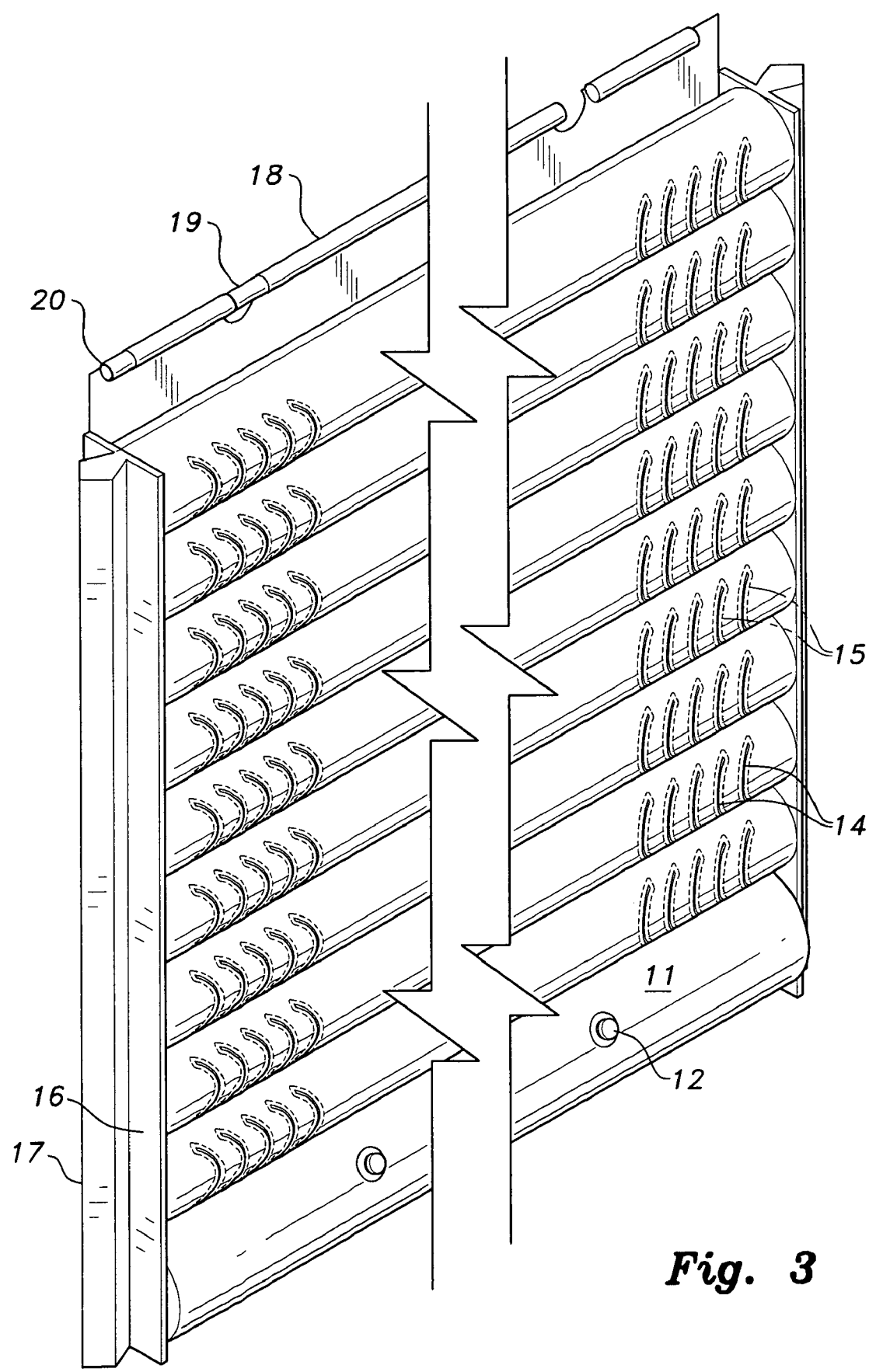
FIG. 3 is a detailed partial perspective view of one wall of the flood prevention device according to the present invention.

At least one gill tube 13 may be stacked atop the sand tube 11 and stitched together to define the effective height of the barrier wall. Each gill tube 13 includes a plurality of reinforced gills, slits or slots 14 disposed on opposite sides of the gill tube 13. The gills 14 permit flood water to flow in and out of the gill tube 13 to thereby fill the same and concurrently reinforce the barrier provided by the gill tube 13. As shown in FIG. 3, the gills 14 are reinforced with reinforcing material 15 stitched around each gill 14. The reinforcing material 15 may cover the opening of a respective gill 14, which helps to filter out debris and passively control water flow. Along the same lines, additional reinforced gills 14 may be disposed on the back side of the gill tube 13 to permit some water flow through the gill tube 13 resulting in some pressure relief to the sectional barrier wall in the face of a flood. As an alternative, the gill tube 13 may include no gills 14 and instead be filled with air to form a cushion. As a further alternative, the gill tubes 13 may be replace with a tarpaulin stitched to the sand tube 11 and stretched to the desired height. The gill tubes 13 are preferably made from either inflatable or relatively stiff, non-inflatable water impermeable materials.

Each sectional barrier wall includes a hanging or top tube 18 disposed atop the stack of gill tubes 13. The hanging tube 18 includes rings through which hanging or lifting poles 19 may be threaded. The hanging poles 19 are interlocking such that more than one pole 19 may be connected together to conform to the length of the barrier wall. As shown in FIG. 2, each hanging pole includes a locking extension or member 20 at one end and a hollow socket 21 at the opposite end, the locking extension 20 of one pole 19 adapted to fit into the socket 21 of an adjacent pole 19.

The overall structure of each of the barrier walls is maintained by a locking bracket or rail 16 attached to distal ends of the sand tube 11 and gill tubes 13 stack. Each locking rail 16 includes a male connector or dovetail rail 17, the details of which will be further explained below. Although FIGS. 2 and 3 disclose the locking rail 16 as a single, elongate element, it is also possible to have the locking rail 16 configured as discrete locking rails attached to opposite, distal ends of each of the gill tubes 13 and the sand tube 11.

As noted above, each sectional barrier wall is adapted to be attached together to form a barrier around the structure to be protected. To accommodate such construction, the flood prevention device 10 includes an locking extender rail 22 and a locking corner rail 30.

The locking extender rail 22 may be a substantially rectangular block of sturdy, lightweight material having female connectors or dovetail locking grooves 23 formed on opposing ends of the locking extender rail 22. These grooves 23 are adapted to insertably receive the dovetail rail 17 of respective locking rails 16 to thereby extend the overall length of the barrier. To prevent the locking rail 16 from inadvertently sliding out of the locking groove 23, a locking bracket 24 may be inserted over the connection. The locking bracket 24 may be included on both the top and bottom of the locking extender rail 22.

The locking corner rail 30 may be an angled, substantially rectangular block of sturdy, lightweight material having female connectors or dovetail locking grooves 32 formed on distal ends of the locking corner rail 30. The locking corner rail 30 defines the corner of the overall structure barrier. These grooves 32 are adapted to insertably receive the dovetail rail 17 of respective locking rails 16. To prevent the locking rail 16 from inadvertently sliding out of the locking groove 32, a locking bracket 32 may be inserted over the connection. The locking bracket 32 may be included on both the top and bottom of the locking corner rail 30.

Figure 4:
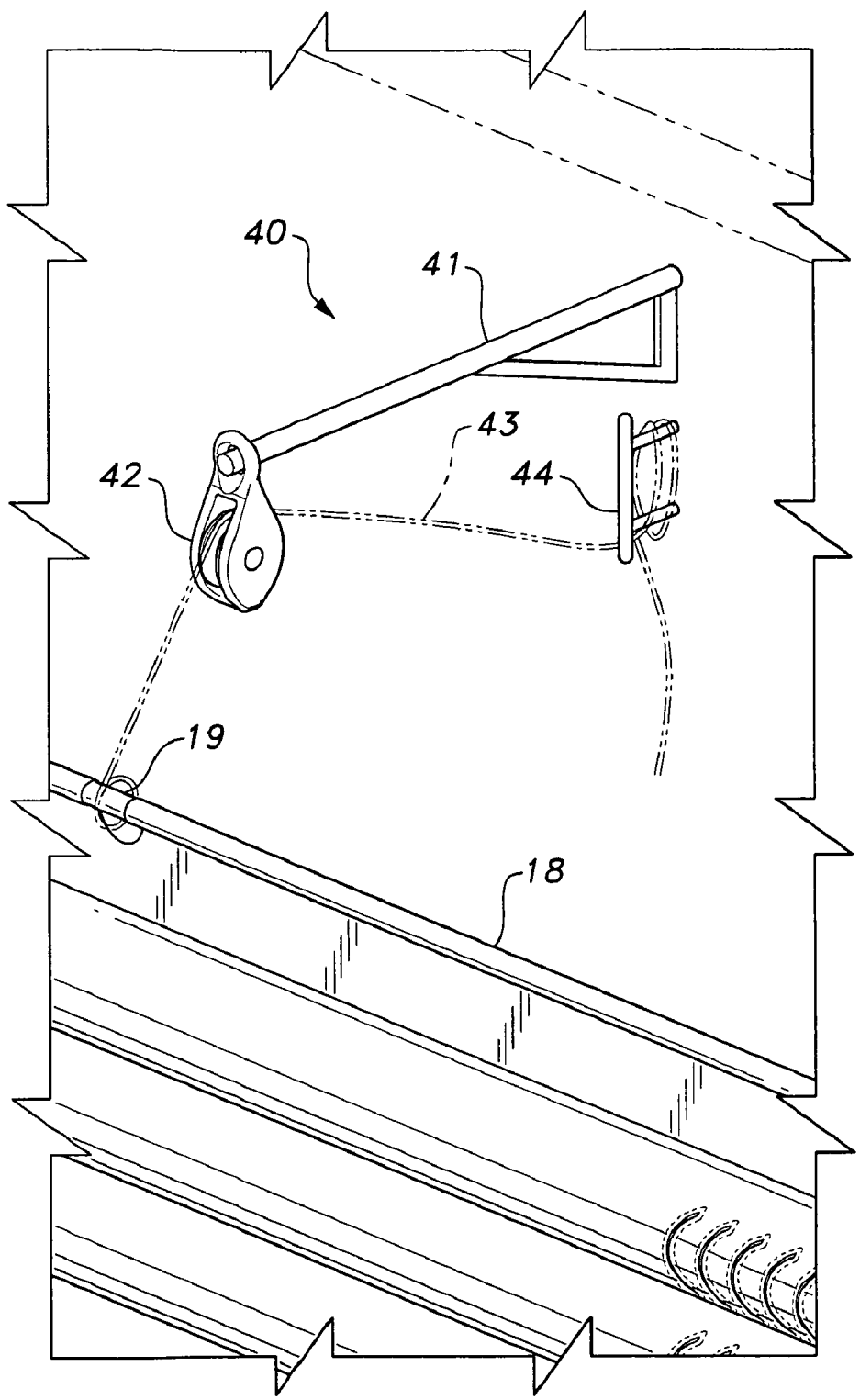
FIG. 4 is a detailed partial perspective view of the flood prevention device according to the present invention, showing the pulley mooring system.

Once assembled, the flood prevention device 10 includes a pulley mooring system 40 to facilitate lifting and rapid deployment of the flood prevention device 10. As shown in FIG. 4, the pulley mooring system 40 includes a pulley 42 attached to one end of a bracket 41. The other end of the bracket 41 may be attached to a side of the structure or building B. Alternatively, the pulley 42 may be attached to an overhang on top of the building B as shown in FIG. 1. A cable 43 is threaded through the pulley 42 to have one end attached to the hanging pole 19. The other end of the cable 43 may be tied to an anchor 44. As a further alternative to the above, the anchor 44 may serve as a hanging bracket for the pulley 42. To stow the flood prevention device 10, the user pulls the cable 43 to lift the flood prevention device 10. To rapidly deploy the flood prevention device, the user simply loosens the cable 43 from the anchor 44.

Thus, it can be seen that the flood prevention device 10 may be assembled with relative ease. Each sectional barrier wall is modular with a high degree of flexible configuration where the overall dimension of each barrier wall can be accommodated according to user defined dimensions. Moreover, the locking corner rails 30 and the locking extender rails 10 permit the flood prevention device 10 to be configured for the dimensions of an individual building.

It is noted that the flood prevention device 10 encompasses a wide variety of alternatives. For example, the flood prevention device 10 may be colored or painted and/or include indicia for advertising or personal preference. The flood prevention device 10 may be included in a package kit having all the elements to form a barrier wall and/or optional locking corner and extender rails 30, 22.

It is to be understood that the present invention is not limited to the embodiments described above, but encompasses any and all embodiments within the scope of the following claims.

We claim:

1. A flood prevention device, comprising:
    at least one barrier wall adapted to protect a building from floods, the barrier wall having;
        a base sand tube forming a foundation for the wall, the sand tube being adapted to be filled with sand;
        at least one gill tube attached to the sand tube, the at least one gill tube being adapted to permit flood water flow to fill the at least one gill tube, the at least one gill tube defining an effective barrier wall height;
        a hanging tube attached to the at least one gill tube;
        a locking rail disposed on distal ends of the sand tube and the at least one gill tube;
    a locking corner rail for forming a corner of an overall barrier, the locking rail connecting the locking corner rail to the at least one barrier wall; and
    at least one mooring system attached to the at least one barrier wall for stowing and rapidly deploying the overall barrier in the event of a flood.

2. The flood prevention device according to claim 1, further comprising a locking extender rail interconnecting adjacent barrier walls.

3. The flood prevention device according to claim 2, wherein the locking extender rail comprises:
    a substantially rectangular block; and
    a locking groove formed on distal ends of the block, the locking grooves adapted to insertably receive the locking rail of respective barrier walls.

4. The flood prevention device according to claim 1, wherein the sand tube is a substantially elongate tube having at least one fill hole and a fill plug for the at least one fill hole.

5. The flood prevention device according to claim 1, wherein the gill tube is a substantially elongate tube having a plurality of gills disposed thereon, the gills permitting passively controlled water flow.

6. The flood prevention device according to claim 5, wherein the gills are reinforced.

7. The flood prevention device according to claim 5, wherein the gills are disposed on both front and back sides of the elongate tube.

8. The flood prevention device according to claim 1, wherein the hanging tube is a substantially elongate tube attached to the at least one gill tube, the elongate hanging tube having at least one loop and at least one hanging pole threaded through the loop, the hanging pole being operatively attached to the mooring system.

9. The flood prevention device according to claim 8, wherein the at least one hanging pole includes a male connector and a female connector, the male and female connectors being adapted to interconnect adjacent hanging poles.

10. The flood prevention device according to claim 1, wherein the locking corner rail is a bent, substantially rectangular block having a locking groove formed on distal ends of the block, the locking grooves being adapted to insertably receive the locking rail of respective barrier walls.

11. The flood prevention device according to claim 10, wherein the locking rail is a dovetail rail, the dovetail rail being adapted to insertably mount the locking grooves of the locking corner rail.

12. The flood prevention device according to claim 1, wherein the at least one mooring system comprises:
    a hanging bracket adapted to be attached to a side of the building;
    a pulley disposed on the hanging bracket;
    an anchor adapted to be attached to a side of the building; and
    a cable threaded through the pulley and having one end attached to the hanging tube and an opposite end attached to the anchor;
    wherein pulling the cable lifts the overall barrier into a stowed position and detaching the cable from the anchor rapidly drops the overall barrier into a flood prevention position.

* * * * *